Figure 1:
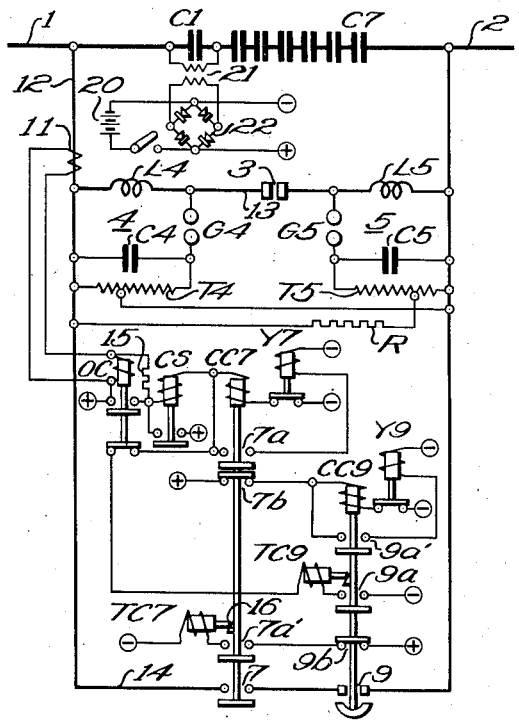

April 30, 1946. R. E. MARBURY 2,399,367
SERIES CAPACITOR PROTECTION
Filed June 4, 1942

WITNESSES:
Robert C. Baird
Nw. C. Goodwe

INVENTOR
Ralph E. Marbury.
BY O.B. Buchanan
ATTORNEY

Patented Apr. 30, 1946

2,399,367

UNITED STATES PATENT OFFICE 2,399,367

SERIES CAPACITOR PROTECTION

Ralph E. Marbury, Wilkinsburg, Pa., assignor to Westinghouse Electric Corporation, East Pittsburgh, Pa., a corporation of Pennsylvania Application June 4, 1942, Serial No. 445,751

5 Claims. (Cl. 175—294)

My invention relates to series capacitors which are designed for use in a transmission line connecting power-sources for the purpose of cancelling line-reactance, and it has particular relation to protective means which will make such series capacitors economically feasible and justifiable. Certain problems arise, including the following considerations.

Since the cost of the series capacitor increases approximately in accordance with the square of the voltage-level for which it is insulated, and since the short-circuit current of the line may be four or five times the full-load current of the line, or even more, considerations of economy obviously require that the series capacitor shall be designed and built at a voltage-level of insulation corresponding to the voltage-drop through the capacitor at the rated line-current, rather than at the maximum expectable short-circuit current, if it is feasible to use the lower-rated capacitor. It is an object of my invention to provide protective means which are adapted to make the lower-rated series capacitor feasible.

Since the transmission systems requiring the use of series capacitors are synchronous transmission systems, the utility of which is limited by the ability of the transmission line to maintain synchronism between the two power sources which are connected by the line, and since the synchronizing power of any line finds its limiting or critical value or condition in the phase-angle power-swings or surges which start during the existence of a fault, and which continue for a fraction of a second or several seconds after the clearing of the fault by means of an appropriate operation of the line-sectionalizing breakers, it is requisite, if a series capacitor is to be justified at all, as a means for increasing the synchronizing stability or increasing the power-limits of a transmission line, for the series capacitor to be available, as a means for cancelling line-reactance, immediately following the clearing of the fault by the line-sectionalizing breakers. If the series capacitor is to be rated in accordance with the voltage-drop through it for full-load line-currents, it will be necessary, in general, to bypass the series capacitor during the flow of heavy fault-currents in the line, and means must be provided, not only for thus bypassing the series capacitor, but for very quickly and promptly restoring the series capacitor to service after the fault has been cleared by the line-protective apparatus, which usually means a restoration of the series capacitor to service within an outside limit of 10 or 12 cycles, on a 60-cycle basis, after the occurrence of the fault-condition. My present invention relates to protective apparatus of this sort.

In its more specific aspects, my invention relates to improvements in trigger-gap means which are utilized to control the breakdown of a main gap-device which is utilized to bypass the series capacitor in the event of line-current-flow in excess of the rated full-load current of the line. My improvements in the trigger-gap means have a general object to provide improved trigger-gap-circuits, or principles of design, which are less sensitive to asymmetrical switching-surges of half-cycle duration, or thereabouts, which are of too short duration to harm the series capacitors.

An object of my invention is to provide an improved trigger-gap circuit-arrangement in which a serially connected choke-coil or inductance is utilized in series with the trigger-gap in such manner as to not only reduce the sensitiveness of the trigger-gap to impulses, but also to prevent the trigger-gap, when it arcs over, from so reducing the voltage which is available across the terminals of the main gap-device as to prevent a breakdown of the latter, resulting in the establishment of a capacitor-bypassing path through the trigger-gap which is not designed for more than momentary, light-current density, such difficulties having been occasionally encountered, in the past, particularly where especially wide spacings of the electrodes of the main gap-device were utilized, requiring a trigger-gap voltage several times that of the breakdown-voltage of the main gap-device.

A further important object of my invention is the provision of a novel trigger-gap arrangement, or a combination of a plurality of different sorts of trigger-gap arrangements, whereby an inverse time-characteristic is obtained, so that the trigger-gap assembly may be set to protect the series capacitor when the voltage across its terminals is only about 150% or 175% (or any other chosen percentage) of the rated capacitor-voltage at the rated full-load line-current, but a definite time-period of 10 or 15 cycles, or even a minute, may be provided before a triggering action is obtained at these low overvoltage conditions, whereas, if the overvoltage condition amounted to 300% or 350%, or any other desired value, the time-delay of the trigger action would be any other required small amount, such as 1½ or two cycles. The virtue of this type of protection lies in the fact that it is very desirable, and even practically necessary, to prevent long-continued or continuous capacitor-operation at overvoltages of the order of 150%, but it is definitely safe to permit such moderate overvoltages for short periods of time. Hence, if a protective gap-device were arranged so that it would always spill over, and by-pass the capacitor, every time an overvoltage of 150% occurred on the capacitor, an intolerable situation would be obtained in which the capacitor was taken out of service for brief switching surges, or motor-starting periods, or brief intervals of whatever cause, which would not have harmed the capacitor at all, and which introduced switching-surges and disturbances on the line because of the operation of the protective-gaps of the series capacitors. On the other hand, an overvoltage of considerably more than 200%, or say 300% or more, could be permitted for only the shortest of transients of less than ½ cycle, or thereabouts, without damage to the capacitor. The introduction of the inverse time-element, in the operation of the capacitor-protecting gaps, thus makes it possible to fully and adequately protect the capacitor against overvoltages, and hence overcurrents, of both mild and severe nature, properly discriminating between conditions which require a capacitor-bypassing operation, and conditions which do not.

With the foregoing and other objects in view, my invention consists in the apparatus, combinations, circuits, systems and methods hereinafter described and claimed and illustrated in the accompanying drawing wherein the three figures are diagrammatic views of circuits and apparatus illustrating my invention in three forms of embodiment, with all apparatus shown in the de-energized condition.

In Figure 1 I have illustrated my invention in connection with the protection of the series capacitors C1 to C7 which are connected in series with one phase-conductor 1—2, of a synchronous transmission system, after the manner described in a copending application of R. D. Evans, A. C. Montieth and myself, Serial No. 445,562, filed June 3, 1942, on which the present application is an improvement. The series capacitors C1—C7 are bypassed by a main gap-device 3, the breakdown-characteristics of which are controlled by means of one or both of two pilot-gap devices 4 and 5. The series capacitors C1—C7 and the main gap 3 are also bypassed by the main contacts of a normally open contactor 7 and a normally closed circuit-breaker 9, or any other suitable means for protecting the main-gap device 3, extinguishing its arc, and restoring the series capacitors C1—C7 to service after the subsidence of the fault-current in the line 1—2, it being understood that the line is provided with the usual, or any suitable, fault-responsive protective-means for segregating faulty line-sections, in a manner well known in the art.

My present invention relates more particularly to the improved trigger-gap apparatus indicated at 5, or to the combined use of such an improved trigger-gap apparatus in combination with a conventional or instantaneous-type of trigger-gap 4. Both trigger-gap equipments 4 and 5 consist, essentially, of a high-frequency tuned circuit comprising an air-core inductance and a capacitor, indicated at L4, C4 and L5, C5, respectively, with pilot or trigger-gaps G4 and G5 respectively, to initiate the action, and with a suitable means for charging the capacitors C4 and C5, respectively, from the voltage across the series capacitors C1—C7, as indicated by the step-up auto-transformers T4 and T5, respectively. The impedances L4 and L5 are connected in series with the main gap-device 3, so as to impress thereon a high-frequency voltage corresponding to the voltage of the charge on the capacitor C4 or C5, as the case may be, at the moment of arcing over of the pilot-gap G4 or G5. I believe that it would be feasible to utilize a common inductance-device L4 or L5 for both of the trigger-gap equipments 4 and 5, but at present I prefer to utilize separate inductances L4 and L5, connected in series with different electrodes of the main gap-device 3, as I believe this to be sounder engineering practice, in making sure of flashing over the main gap 3, and avoiding difficulties in connection with the possible flashing over of both of the pilot gaps G4 and G5 before the main gap 3 breaks down.

It is known in the art, in connection with the trigger-gap device 4, that the auto-transformer T4 keeps the capacitor C4 charged at a voltage which is proportionate to the series-capacitor voltage, at some value such as 200%, 300%, or the like. The trigger-gap G4 is set to spill over at a C4 capacitor-voltage corresponding to any predetermined overvoltage on the series capacitors C1—C7, and when this happens, it sets up a high-frequency oscillation between the capacitor C4 and the inductance L4, which is communicated to the adjacent electrode of the main gap 3, and applies a sufficiently high voltage to said main gap to cause it to break down under all possible gap-conditions.

It will be noted that the conventional trigger-gap device 4 operates every time the capacitor-voltage of the series capacitors C1—C7 reaches a predetermined overvoltage, such as 300% of its rated voltage corresponding to full-load line-current, and it responds substantially instantaneously, if built with any reasonable or usual ratio between the resistance and the reactance of the transformer T4. I wish this illustration of the conventional trigger-gap means 4 to be understood as symbolic of any means for causing the main gap 3 to substantially instantaneously break down upon the attainment of a predetermined voltage, such as three times the peak value of the capacitor-voltage corresponding to normal full-load line-current. For reasons understood in the art, I frequently prefer to relegate the breakdown-controlling function to a pilot-gap arrangement such as that which is shown at 4, because of the greater ease in maintaining accuracy and consistency of breakdown-voltage calibration, and because of the greater flexibility of the design of the main gap 3 when it can be designed without regard to maintaining any particular, or nicely controlled, breakdown-voltage. I wish it to be understood, however, that the main gap 3, itself, may be relied upon to break down at some particular overvoltage, such as 300% of the normal peak value, without resorting to the use of a trigger-gap device 4 to perform this function.

In accordance with my present invention, I modify the other trigger-gap device 5 so as to make it respond selectively to currents or voltages of the power-line frequency, such as 60 cycles, and so as to build up its response in accordance with a predetermined inverse-time characteristic in response to any change in the impressed line-frequency voltage. I accomplish these functions by tuning the reactance of the transformer T5 with the capacitance of the capacitor C5, so as to be substantially resonant at the line-frequency of, say, 60 cycles, and adding an external resistor R, in the exciting-circuit of the tuned couple T5—C5, in such magnitude as to produce whatever time-constant may be desired. With an iron-core coil T5 of ordinary design, with a Q ratio of $\omega L/R_5$ of around 10, which is quite ordinary and reasonable, in a coil which does not require special designing, time-delays of around 15 cycles can easily be obtained, without increasing the external resistance R to a value which will reduce the final voltage across the resonant circuit T5—C5 to too low a value. In the expression for the ratio $Q = \omega L/R_5$, it will be understood that L represents the inductance of the transformer T5 and $R_5$ represents its internal resistance. The value of the external resistance R will, of course, be suitably modified in accordance with the transformer-ratio, in a manner which can be readily calculated, or determined by simple test.

With the improved tuned resistance-retarded circuit which is shown for the inverse-time trigger-gap device 5 in Fig. 1, the voltage appearing across the capacitor C5 in the resonant 60-cycle circuit C5—T5 does not immediately become greater when the voltage across the series capacitor C1—C7 increases, but the 60-cycle oscillations in the tuned circuit C5—T5 gradually become larger, increasing according to a logarithmic scale, so that inverse-time-graduated protective voltage-levels could be expected, for limiting the overvoltages which are permitted to appear across the series capacitors C1—C7 for different lengths of time, before the main gap-device 3 would spill over and bypass the line current from the series capacitor. The following table is given as an example of the manner in which the modified trigger-gap circuit 5 could be designed to operate, with the understanding that the suggested figures are only illustrative, as wide variations in voltages and time-periods are possible, in accordance with individual requirements of the series capacitor or of the transmission system being protected.

| Line amps. | Capacitor voltage C1-C7 | Elapsed time before G5 operates | Percent of steady-state voltage to reach breakdown of G5 |
|---|---|---|---|
| | | Cycles | Per cent |
| 800 | 32,800 | | |
| 1,200 | 49,000 | 10 | 100 |
| 1,400 | 57,000 | 5 | 85 |
| 1,600 | 65,000 | 4 | 75 |
| 1,840 | 75,000 | 3 | 65 |
| 2,400 | 98,400 | 2 | 50 |

In operation, my improved trigger-gap method, by which I introduce an inverse-time element, thus makes it possible, for the first time, in any feasible system, to set the breakdown-voltage of the main gap-device at a low overvoltage value, such as 150% of the peak value of the normal voltage on the series capacitor, corresponding to 150% of full-load line-current, without running the risk of producing many faulty gap-operations in response to brief overvoltage conditions of such short-time duration that no possible harm could be inflicted upon the series capacitor. It should be borne in mind that a capacitor does not fail instantly, by a breakdown of its insulation or dielectric, upon the occurrence of a moderate overvoltage, but failure comes as a result of overheating, usually at a certain localized spot, but nevertheless a combination of heat and time, which causes a failure of the insulation or dielectric, which explains why the capacitor is perfectly able to withstand brief, limited overvoltages for short lengths of time, without any possible danger of damage to the capacitor. It is at present not considered good practice to submit an ordinarily designed, commercial capacitor, such as would be designed for shunt-circuit service for power-factor correction, to over-voltages in excess of 300% or 350% of the normal peak voltage value, at least not for longer than a fraction of a cycle, or possibly up to something like 1½ cycles, and to this end, the exponential time-curve of the resistance-limiting tuned-circuit T5—C5 may be adjusted so that the pilot-gap G5 spills over, and instantly flashes the main gap 3, at, say, a 300% overvoltage on the series capacitors C1—C7, within any prescribed time-limit such as 1 or 1½ cycles, while the length of the time-constant may be chosen long enough to obtain the necessary time-delays for lower overvoltage conditions such as 150%, or any other lower voltage-limit which may be desired. Or the time-constants may be more flexibly handled, in the design of the resistance-limited tuned-circuit T5—C5, by designing this circuit to give the desired delayed-time breakdowns in response to the lower range of overvoltage values, such as 150% or 200%, without regard to the quickness of response at the higher overvoltages of 300% or 350%, leaving the main gap 3, itself, or the main gap 3, with the aid of the conventional trigger-gap means 4, to instantaneously breakdown in response to the higher voltage limit of 300% or 350%. I have illustrated the latter means of protection, although I wish it to be understood that I am not altogether limited to this detail.

Many desirable main-gap devices 3 are of a nature in which an arc, once established therein, will tenaciously hang on, restriking itself after every current zero, without becoming extinguished until the line-current is reduced to a very low value, very much below the full-load current of the line. In such cases, it is necessary to resort to the bypassing circuit 7—9 or other external means for extinguishing the arc in the main gap-device 3, in order to remove the short circuit from across the series capacitor C1—C7, so as to restore the series capacitor to service again. It should be understood that, when a fault occurs on the line, the usual fault-responsive protective equipment of the line (not shown) will come into play to remove the faulted section of the line from the rest of the system, so as to remove the fault from the system, either thereafter leaving the faulted line-section out of service, or promptly restoring it to service again, if the fault thereon is of a nature which clears itself as soon as the voltage is removed from that section of the circuit. The removal or disconnection of the faulty section from the rest of the transmission system usually requires something like from 4 to 8 cycles, on present transmission systems of the type which I have primarily in mind, in connection with my present invention, although my invention is not limited to such systems. During this time, and sometimes during the period immediately following the clearing of the fault, the system is subjected to a shock, resulting in a certain rate of change of the phase-angles of the voltages at the sending and receiving ends, during which time the two ends of the system are moving toward an out-of-synchronism condition, and it is this movement which, if not suitably checked, in time, results in loss of stability of synchronism between the two ends of the system. Since the main purpose of the series capacitor, in transmission systems where stability is a limit, is to increase the stability-limits or stabilizing power of the system, it is obvious that the series capacitor must be restored into service again, as promptly as possible after the line-fault has been cleared by the line-protective equipment (not shown), or after the line-current returns to its normal 100% full load value, or usually to some slightly higher value such as 115%. It is necessary, therefore, to provide some means, operative promptly after the subsidence of the line-current, for clearing the bypassing circuit, from around the series capacitor C1—C7, after the main gap 3 has broken down or arced over.

In Fig. 1, I have illustrated one particular means for restoring the series capacitor C1—C7 to service again after the main protective gap 3 breaks down, but I wish it to be understood that this particular capacitor-restoring means is only one of several, which are available, some of which have been discussed in the previously mentioned Evans et al. application. In the particular capacitor-restoring means shown in Fig. 1, the gap-current in the main gap 3 is first transferred to a shunt-path containing the contactor-contact 7 and the breaker-contact 9, thereby extinguishing the arc in the main gap 3 by reducing the applied voltage practically to zero, and subsequently this breaker-contact 7—9 bypassing circuit is opened, preferably in response to a definite indication that the line-current has subsided to 115% of its full-load value, or to any other predetermined value.

In Fig. 1, I utilize a current-transformer 11 in a portion 12 of the circuit which supplies current from the line 1 to both the bypassing-circuit 13 which contains the main gap 3, and the bypassing circuit 14 which contains the contactor-contact 7 and the breaker-contact 9. I utilize this current-transformer 11 to energize an overcurrent relay OC, which picks up and closes a make-contact and opens a back-contact, said contacts being sufficiently identified by reference to the relay-designation OC. I utilize the make-contact of OC for two purposes, first to introduce a resistance 15, or other impedance, in shunt around the operating-coil of the OC-relay, and second, to energize the closing coil CC7 of the contactor 7. The relay-shunt 15 is utilized in order to make it easier to design the overcurrent relay OC so that it will be sure to pick up at a current which is slightly lower than the minimum overcurrent which will bring about a long-time-delayed sparking of the inverse-time trigger-gap G5, while also making sure that the overcurrent relay OC will drop out, so as to reclose the back-contact of OC, when the line-current subsides to a value which is somewhat greater than the normal full load current of the line, such as 115% thereof, so as to make sure that the overcurrent relay OC shall drop out if a fault-current or other excess-voltage condition appears on the series capacitor at a time when the line is carrying its full rated load.

The energizing circuit of the closing coil CC7 of the contactor 7 is completed through a serially connected coil CS of a contactor-switch which picks up and seals itself in through its make-contact CS, so as to maintain an energizing circuit as long as any current is being delivered through said circuit. The energizing-circuit of the closing coil CC7 also includes the back-contact Y7 of a cutoff relay Y7 which is normally deenergized, and which is energized upon the closure of an auxiliary make-switch 7a on the contactor 7. In this manner, as soon as the contactor 7 has been actuated to its closed position, the current through the actuating coil CC7 is interrupted. The contactor 7 is held in its closed or actuated position by means of a latch 16, which is released by a trip-coil TC7.

By means of the contactor 7, therefore, since the breaker contact 9 is already closed, in the normal position of the apparatus, the initiation of a capacitor-bypassing current through the circuit 12—13, when the main gap 3 breaks down, causes the contactor 7 to close and establish a bypass circuit 14 around the bypass circuit 13, thus extinguishing the arc in the main gap-device 3. The contactor can easily be designed to close in almost any required time, times of the order of one cycle or 1½ cycles being readily obtained. The circuit then remains in this condition, with the line-current being carried by the bypassing circuit 12—14, around the series-capacitor C1—C7, until the line-current subsides to the dropout point of the overcurrent relay OC, at which time said relay becomes deenergized, reclosing the back-contact of OC, and establishing a circuit to the trip-coil TC9 of the circuit breaker 9, the trip-coil circuit being completed through an auxiliary breaker make-contact 9a, as is customary in the art. The circuit breaker 9 thereupon opens, being desired to open in as short a time as is economically feasible, in the construction of the breaker, an opening-time of 4 cycles or less being readily obtainable. When the main contact 9 of the breaker opens, the bypassing circuit 14 is interrupted, thus restoring the series capacitor C1—C7 into service.

When the breaker 9 opens, an auxiliary back-contact 9b on the breaker closes, and energizes the contactor-trip-coil TC7, through an auxiliary front-contact 7a' on the contactor, thereby tripping out the contactor, so as to restore the latter to its open position and at the same time deenergizing the contactor switch CS which has remained energized all this time. As soon as the contactor 7 reopens, it closes an auxiliary back-contact 7b, and energizes the breaker-closing-coil CC9, the circuit of which is completed through the back-contact Y9 of a cutoff switch Y9 which becomes energized through an auxiliary make-contact 9a' on the breaker 9 as soon as the breaker is closed, thus deenergizing the breaker-closing coil CC9, and leaving the light-current cutoff switch Y9 connected across the battery which supplies all of the relays, except the overcurrent relay OC, as indicated by the terminals (+) and (—).

In Fig. 1, I have also indicated a convenient means for energizing a battery 20 having the terminals (+) and (—), utilizing, for this purpose, the voltage which is obtained across the first one of the series-capacitors C1, stepped down through a potential transformer 21, and rectified through a trickle-charger bridge 22. In this manner, the entire operating-equipment can be mounted on an insulated platform (not shown) so as to be operating substantially at the voltage of the transmission line 1.

Figure 2:
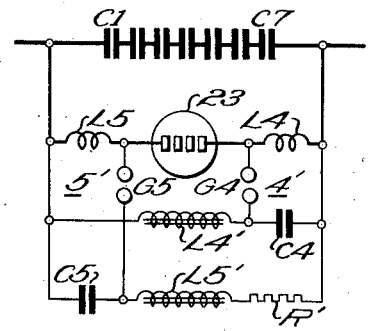
Figure 3:
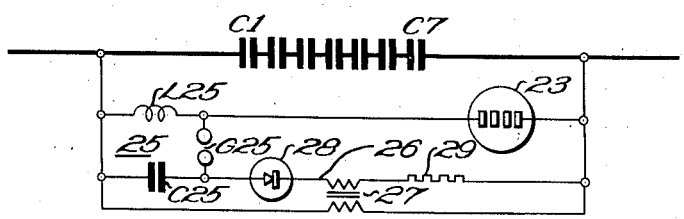

As previously indicated, I am not limited to the particular means, shown in Fig. 1, for causing an extinction of the arc in the main gap device 3. In Figs. 2 and 3, for example, I have shown, instead of open-air gap-device 3, a vacuum-type or low-pressure gap-device 23, consisting of a plurality of short gaps between metal electrodes, in series, operating in gas at a reduced pressure, in such manner that it is, or may be, possible to design the gap so that it will, by itself, hang on to an arc, once established therein, only so long as the line current exceeds 115% of its normal full load value, after which time the arc will become unstable and go out, of its own accord. Such a vacuum-type gap-device 23 might be a modification or adaptation of the general design-principles which are illustrated and described in an application of William E. Berkey, Serial No. 349,390, filed August 2, 1940, or an application of William E. Berkey and William H. Cuttino, Serial No. 411,142, filed September 17, 1941.

It has also been intimated, hereinabove, that I am not limited to the particular resistance-retarding tuned circuit means shown in Fig. 1 for obtaining the inverse-time characteristic of the trigger-gap device, and it has also been hereinabove intimated that the general object of my invention is to improve trigger-gap circuits, in general, that is, without limitation to the inverse time element, so as to be selectively sensitive to line-frequency, or 60-cycle, currents, in the sense of being relatively insensitive to shock-excitation. I have illustrated both of these features in the two trigger-gap circuits 4' and 5' of Fig. 2. Here, again, either trigger-gap circuit may be utilized alone, or the duty of the instantaneously operating trigger-gap circuit 4' may be relegated, either to the inverse-time trigger-gap circuit 5' or to the main-gap device 23, which can be designed to break down at a particular value, although it is more difficult to make the main gap device 23 both break down at a particular value, such as 300% voltage, while extinguishing its arc at another particular value, such as 115% line-current.

In Fig. 2, the instantaneously operating trigger-gap device 4' is modified by dispensing with the shunt-connected transformer T4 for exciting the capacitor C4 with a voltage which is a multiple of the voltage on the series capacitor C1—C7, and replacing it with a serially connected iron-core choke coil L4' which is connected in series with the capacitor C4, so that the circuit containing the choke coil L4' and the capacitor C4 is energized from across the terminals of the series capacitor C1—C7. The inductive reactance of the choke coil L4' is not quite as large as the capacitive reactance of the capacitor C4. If these two reactances L4' and C4 were tuned to unity power-factor operation, the voltage appearing across C4 would be very many times that of the voltage appearing across the series capacitor C1—C7. However, by utilizing the choke coil L4' to neutralize only a part of the impedance of the capacitor C4, the capacitor-voltage across C4 may be readily made to be any number of times that of the series-capacitor C1—C7, values such as 200% to 300% being probably preferable. When the capacitor C4 reaches any particular voltage, for which the gap G4 is set, the gap G4 breaks down and initiates the arcing of the main gap-device 23 by reason of the high-frequency tuned-circuit L4, C4, as previously described in connection with Fig. 1.

The improved instantaneously operating trigger-gap circuit 4' of Fig. 2 has two important advantages, as distinguished from the conventional trigger-gap circuit shown at 4 in Fig. 1. First, the presence of the choke-coil L4', in series with the circuit through which the capacitor C4 is charged from the series-capacitor voltage, renders the trigger-gap circuit insensitive to steep-wave-front surges, or asymmetric surges of one-half cycle duration, such as switching surges, because the inductance or choke-coil L4' has a much higher impedance to steep-wave-front surges than to the normal, 60-cycle current or voltage. In the second place, the presence of the choke coil L4', in shunt-circuit relation to the main gap-device 23, makes it impossible for the trigger-gap G4 to draw so much energy as to pull down the voltage across the main gap 23 to a value below which the main gap will not break down, thus avoiding the difficulty which was sometimes obtained with the conventional trigger-gap circuit shown at 4 in Fig. 1, particularly when the trigger-gap voltage was several times higher than the voltage across the main series transformer C1—C7, whereby sometimes the trigger-gap G4 of the type shown in Fig. 1 would draw sufficient energy to by-pass the main capacitor C1—C7 to such an extent that the main gap-device could not be caused to spark over. In Fig. 2, the presence of the serially connected choke coil L4' makes it impossible for the auxiliary gap G4 to take so much energy that the main gap 23 will not break down.

In Fig. 2, I have also shown a modification of the inverse-time trigger-gap circuit 5, in which a serially connected iron-core inductor L5' is utilized in series with the auxiliary capacitor C5, but in this case the inductive and capacitive impedances of L5' and C5' are substantially tuned to resonance, or unity-power-factor operation, at the line-frequency, such as 60-cycles, and a resistance R' is also connected in series with the choke coil L5', or else built into the internal construction of the choke coil or inductor L5', in the way of a special, high-resistance reactor-design. The presence of the resistance R' in the series-resonance circuit C5—L5' introduces a time-constant which can be adjusted, by utilizing a sufficient or proper magnitude of resistance R', so as to make the value of the voltage across the capacitor C5 of this tuned circuit respond sluggishly, in accordance with an exponential inverse-time characteristic, whenever there is any change in the voltage appearing across the series capacitor C1—C7, thus accomplishing the delayed-time operation which has already been explained in connection with Fig. 1.

In the inverse-time trigger-gap circuit 5 of Fig. 2, for example, we may let R be the resistance, L the reactance, and C the capacitance of the serially connected circuit R', L5', C5, and we may let $v = V \cos(wt - A)$ be the impressed 60-cycle voltage, which is the voltage of the series capacitors C1 to C7 in the line, noting that $wL = 1/wC$, which is the condition for tuning for resonance. As shown in "Theory and Calculation of Transient Electric Phenomena and Oscillations," by Charles Proteus Steinmetz, 3d ed., McGraw-Hill, 1920, pages 88–91, the instantaneous voltage across the terminals of the capacitance C (corresponding to C5 in Fig. 2), at any time $t$ after the application of the voltage $v$ to the circuit R', L5', C5, is $$c_c = +\frac{wLV}{R}\sin(wt-A) +$$
$$+\frac{wLV}{R}\left(+\frac{wL}{s}\cos A - \frac{R}{2s}\sin A + \frac{1}{2}\sin A\right)e^{-u_1 t} +$$
$$+\frac{wLV}{R}\left(-\frac{wL}{s}\cos A + \frac{R}{2s}\sin A + \frac{1}{2}\sin A\right)e^{-u_2 t}$$

where $$wL = \frac{1}{wC} = 377L$$

$$s = \sqrt{R^2 - 4w^2L^2} = L\sqrt{u^2-4w^2} = L\sqrt{u^2-568,484} = Lu\sqrt{1-\frac{4w^2}{u^2}}$$

$$u = \frac{R}{L}$$

$$u_1 = w\left(\frac{R+s}{2wL}\right) = \frac{u}{2}\left(1+\sqrt{1-\frac{4w^2}{u^2}}\right)$$

$$u_2 = w\left(\frac{R-s}{2wL}\right) = \frac{u}{2}\left(1-\sqrt{1-\frac{4w^2}{u^2}}\right)$$

The foregoing equation for the output capacitor voltage $v_c$ is valid only for real values of $$s = \sqrt{R^2-4w^2L^2}$$

or when $R>2wL$, as pointed out by Steinmetz on page 92, lines 7 and 8.

The expression for $v_c$ has three terms, the first being the permanent term, the second being a short-time transient which becomes negligibly small after a very short time which is a function of $1/u_1$, which, as will be shown, approximates $1/u$, (measured in seconds), and the third term being a long-time transient which decreases to $1/e = 1/2.7183 = 0.368$ of its initial value when the time $t$ (in seconds) is $1/u_2$, which, as will be shown, approximates $u/w^2$ or $u/142,121$.

For an illustrative example, let us assume a time-period of 3 cycles, or $1/20$ of a second. For $1/u_2$ to equal $1/20$, $$u_2 = 20 = \frac{u}{2} - \sqrt{\frac{u^2}{4}-w^2}$$

$$u = \frac{w^2+400}{20} = \frac{142,121+400}{20} = 7,126 = \frac{R}{L}$$

In other words, if $1/u_2 = 1/20$, the resistance R of the resistor R', in ohms, will be 7,126 times the inductance L in henrys.

If $u = 7126$, as in this illustrative calculation, it follows that the fraction $$wL/R = w/u = 377/7126 = 0.0529$$

which is small compared to unity. We can write, therefore, the following approximations, based upon the assumption that $w/u$ is small compared to unity, $$u_1 = \text{approx. } u$$

$$u_2 = \text{approx. } \frac{w^2}{u}$$

$$s = \text{approx. } Lu$$

$$\frac{wL}{s} = \text{approx. } \frac{w}{u}$$

$$\frac{R}{s} = \text{approx. unity}$$

$$v_c = \frac{wV}{u}\sin(wt-A) +$$
$$+\text{approx. } \frac{wV}{u}\left(+\frac{w}{u}\cos A\right)e^{-ut} +$$
$$+\text{approx. } \frac{wV}{u}\left(-\frac{w}{u}\cos A + \sin A\right)e^{-w^2 t/u}$$

Several observations are apparent. The capacitor-voltage $v_c$ of the capacitor C5 has a permanent peak-voltage value, $wV/u$, which is only a small fraction, $w/u$, of the voltage V which is impressed across the tuned circuit R', L5', C5. The first transient, as shown by the second term of the expression for $v_c$, has only a small initial value, which is approximately $w/u$ times the permanent value shown by the first term of the expression for $v_c$, and this first transient also vanishes after a very short time which is only a few times $1/u_1$ or $1/u$. The second transient, as shown by the third term of the expression for $v_c$, has an initial value which is about equal and opposite to the initial value of the permanent term, and this second transient diminishes to 0.368 of its initial value in $1/u_2$ or approximately $w^2/u$ or $142,121/u$ seconds. In this time, $1/u_2$ seconds, the capacitor-voltage $v_c$ of the capacitor C5 reaches approximately $(1-0.368)$ or 0.632 of its permanent value, which approximates the previously given figure of 65%, for a 3-cycle time-constant, as shown in my illustrative table which I gave in connection with Fig. 1.

It will be understood that this is only an illustration. An increase in the ratio $u=R/L$ makes the time-constant, $1/u_2$, longer, and a decrease in the ratio $u=RL$, down toward a lower limit approaching $u=2w$ or 754, makes the time-constant shorter, down toward a lower limit approaching $1/w$ or 0.00265 of a second. The time-constant is the time (in seconds) for the capacitor-voltage $v_c$ to reach about 63% of its permanent value. It can thus be seen that any required time-constant may be chosen.

I have intimated, hereinabove, that I am not limited to a particular form or type of means for introducing a time-delayed response to slight overvoltages such as 150%, while obtaining a more rapid, or substantially instantaneous, response to predetermined excessive overvoltages, such as 300%. By way of further illustration of this principle, by means which do not require the utilization of a circuit tuned for 60-cycle response, I have indicated a modified trigger-gap circuit 25, in Fig. 3, utilizing an air-core inductance L25 in series with the main gap 23, and an auxiliary capacitor C25 and an auxiliary gap G25 for exciting the inductance L25, and a unidirectional-current circuit 26 for exciting the auxiliary capacitor C25. The unidirectional-current circuit 26 is illustrated as being energized from a potential transformer 27, the primary of which is connected across the terminals of the main series capacitor Cl—C7. The secondary circuit of the potential transformer 27 supplies the auxiliary capacitor 25 with unidirectional-current exciting energy through a rectifier 28 and a high resistance 29, the resistance 29 being of sufficiently high magnitude so that the amount of current supplied to the auxiliary capacitor 25 is so small as to require a considerable time to charge the capacitor 25. Thus, when the voltage across the main series capacitor Cl—C7 changes, the auxiliary capacitor does not respond instantly, but responds sluggishly, in accordance with an exponential, inverse-time characteristic, so that it will reach its predetermined capacitor-voltage, at which the auxiliary gap G25 breaks down, after a time which is longer or shorter in accordance with the magnitude of the overvoltage on the main capacitor Cl—C7. When the gap G25 breaks down, the energy stored in the auxiliary capacitor C25 exchanges back and forth with the energy stored in the air-core inductance L25 in a high-frequency oscillation which is utilized, as before, to cause breakdown of the main gap-device 23.

While I have illustrated my invention in several illustrative forms of embodiment, I wish it to be understood that the broad principles of my invention are susceptible of a wide variation in embodiment, and I do not wish to be limited to the precise forms shown, except as may be required by the specific recitals of the appended claims.

I claim as my invention:

1. The combination, with an alternating-current line-conductor, of a series capacitor, a protective gap-device, means for connecting the series capacitor in series-circuit relation to the line-conductor, means for providing a capacitor-bypassing circuit including said protective gap-device, and trigger-gap means for controlling the breakdown point of the protective gap-device in relation to the voltage appearing across the terminals of the series capacitor, said trigger-gap means comprising a pilot-capacitor, a trigger-gap responsive to the potential of the pilot-capacitor, a high-frequency coil in series with the protective gap-device and in circuit-relation to the pilot-capacitor through said trigger-gap, and means for energizing the pilot-capacitor from the voltage appearing across the series capacitor in such manner as to be considerably more responsive to line-frequency excitation than to steep-wave-front excitation, said energizing-means for the pilot-capacitor including a line-frequency reactor in substantially line-frequency resonance-relation to the pilot-capacitor, and a serially connected resistance of sufficient magnitude so that the trigger-gap voltage does not immediately become greater, when the voltage across the series capacitor increases, but the line-frequency oscillations in the pilot-capacitor gradually become larger, increasing according to a logarithmic scale, thereby to cause a delay of at least several line-frequency cycles in the response of the pilot-capacitor voltage to a change in the voltage appearing across the series capacitor.

2. The combination, with an alternating-current line-conductor, of a series capacitor, a protective gap-device, means for connecting the series capacitor in series-circuit relation to the line-conductor, means for providing a capacitor-bypassing circuit including said protective gap-device, and trigger-gap means for controlling the breakdown point of the protective gap-device in relation to the voltage appearing across the terminals of the series capacitor, said trigger-gap means comprising a pilot-capacitor, a trigger-gap responsive to the potential of the pilot-capacitor, a high-frequency coil in series with the protective gap-device and in circuit-relation to the pilot-capacitor through said trigger-gap, and means for energizing the pilot-capacitor from the voltage appearing across the series capacitor in such manner as to be considerably more responsive to line-frequency excitation than to steep-wave-front excitation, said energizing-means for the pilot-capacitor including a serially connected line-frequency reactance and a serially connected resistance both connected in series with the pilot-capacitor and across the series capacitor, the reactance being of such magnitude as to be in substantial line-frequency resonance with the pilot-capacitor, and resistance being of sufficient magnitude so that the trigger-gap voltage does not immediately become greater, when the voltage across the series capacitor increases, but the line-frequency oscillations in the pilot-capacitor gradually become larger, increasing according to a logarithmic scale, thereby to cause a delay of at least several line-frequency cycles in the response of the pilot-capacitor voltage to a change in the voltage appearing across the series capacitor.

3. The combination, with an alternating-current line-conductor, of a series capacitor, a protective gap-device, means for connecting the series capacitor in series-circuit relation to the line-conductor, means for providing a capacitor-bypassing circuit including said protective gap-device, and trigger-gap means for controlling the breakdown point of the protective gap-device in relation to the voltage appearing across the terminals of the series capacitor, said trigger-gap means comprising a pilot-capacitor, a trigger-gap responsive to the potential of the pilot-capacitor, a high-frequency coil in series with the protective gap-device and in circuit-relation to the pilot-capacitor through said trigger-gap, and means for energizing the pilot-capacitor from the voltage appearing across the series capacitor in such manner as to be considerably more responsive to line-frequency excitation than to steep-wave-front excitation, said energizing-means for the pilot-capacitor comprising a line-frequency reactance-device connected across the terminals of the pilot-capacitor in such amount as to be in substantial line-frequency resonance therewith, and a resistance connected in series with said line-frequency resonance-circuit, said resistance being of sufficient magnitude so that the trigger-gap voltage does not immediately become greater, when the voltage across the series capacitor increases, but the line-frequency oscillations in the pilot-capacitor gradually become larger, increasing according to a logarithmic scale, thereby to cause a delay of at least several line-frequency cycles in the response of the pilot-capacitor voltage to a change in the voltage appearing across the series capacitor.

4. The combination, with an alternating-current line-conductor, of a series capacitor, a protective gap-device, means for connecting the series capacitor in series-circuit relation to the line-conductor, means for providing a capacitor-bypassing circuit including said protective gap-device, and trigger-gap means for controlling the breakdown point of the protective gap-device in relation to the voltage appearing across the terminals of the series capacitor, said trigger-gap means comprising a pilot-capacitor, a trigger-gap responsive to the potential of the pilot-capacitor, a high-frequency coil in series with the protective gap-device and in circuit-relation to the pilot-capacitor through said trigger-gap, and means for energizing the pilot-capacitor from the voltage appearing across the series capacitor in such manner as to be considerably more responsive to line-frequency excitation than to steep-wave-front excitation, said energizing-means for the pilot-capacitor including circuit-means so that the trigger-gap voltage does not immediately become greater, when the voltage across the series capacitor increases, but the line-frequency oscillations in the pilot-capacitor gradually become larger, increasing according to a logarithmic scale, thereby giving the pilot-capacitor an inverse-time characteristic in its response to line-frequency changes in the voltage appearing across the series capacitor, whereby the trigger-gap responds only after a time-delay of at least several line-frequency cycles in response to the minimum overvoltage condition for which the trigger-gap is set.

5. The combination, with an alternating-current line-conductor, of a series capacitor, a protective gap-device, means for connecting the series capacitor in series-circuit relation to the line-conductor, means for providing a capacitor-bypassing circuit including said protective gap-device, and trigger-gap means for controlling the breakdown point of the protective gap-device in relation to the voltage appearing across the terminals of the series capacitor, said trigger-gap means comprising a pilot-capacitor, a trigger-gap responsive to the potential of the pilot-capacitor, a high-frequency coil in series with the protective gap-device and in circuit-relation to the pilot-capacitor through said trigger-gap, and means for energizing the pilot-capacitor from the voltage appearing across the series capacitor in such manner as to be considerably more responsive to line-frequency excitation than to steep-wavefront excitation, said energizing-means for the pilot-capacitor including means for charging the pilot-capacitor unidirectionally, and at a slow rate, in response to the voltage appearing across the series capacitor.

RALPH E. MARBURY.